United States Patent [19]
Coolman et al.

[11] Patent Number: 5,520,475
[45] Date of Patent: May 28, 1996

[54] FASTENING TAB

[76] Inventors: David W. Coolman, N. 7360 Crystal Lake Dr., Plymouth, Wis. 53073; Eugene Sawyer, Rte. 4, Box 350, Shawano, Wis. 54166

[21] Appl. No.: 417,228

[22] Filed: Apr. 5, 1995

[51] Int. Cl.⁶ ............................................. B21D 39/03
[52] U.S. Cl. ........................ 403/242; 29/513; 29/525; 248/546; 403/274
[58] Field of Search ...................... 29/453, 513, 525; 248/546, 909; 403/242, 274, 279, 282

[56] References Cited

U.S. PATENT DOCUMENTS

| | | | |
|---|---|---|---|
| 2,621,947 | 12/1952 | Markvart | 403/274 |
| 2,704,870 | 3/1955 | Becker | 403/395 |
| 3,059,152 | 10/1962 | Khouri | 29/525 |
| 4,021,988 | 5/1977 | Edeus et al. | 52/656.4 |
| 4,494,354 | 1/1985 | Johnston | 52/782.11 |

*Primary Examiner*—Kenneth J. Dorner
*Assistant Examiner*—Andrea Chop
*Attorney, Agent, or Firm*—Francis J. Bouda

[57] ABSTRACT

The fastening device for interconnecting two flat sheets of metal includes a generally rectangular hole in one of the sheets and a generally H-shaped hole in the other. The H-shaped hole includes a pair of inwardly-facing, tapered portions which are adapted to be bent into the rectangular hole of the other member. The dimensions of the tabs are such that when bent inwardly into the rectangular hole, the edges of the tabs are forced against the edges of the rectangular hole so as to cause the two members to be rigidly and securely interconnected without the necessity of the tabs being bent backwardly behind the rectangular opening in the other member.

5 Claims, 1 Drawing Sheet

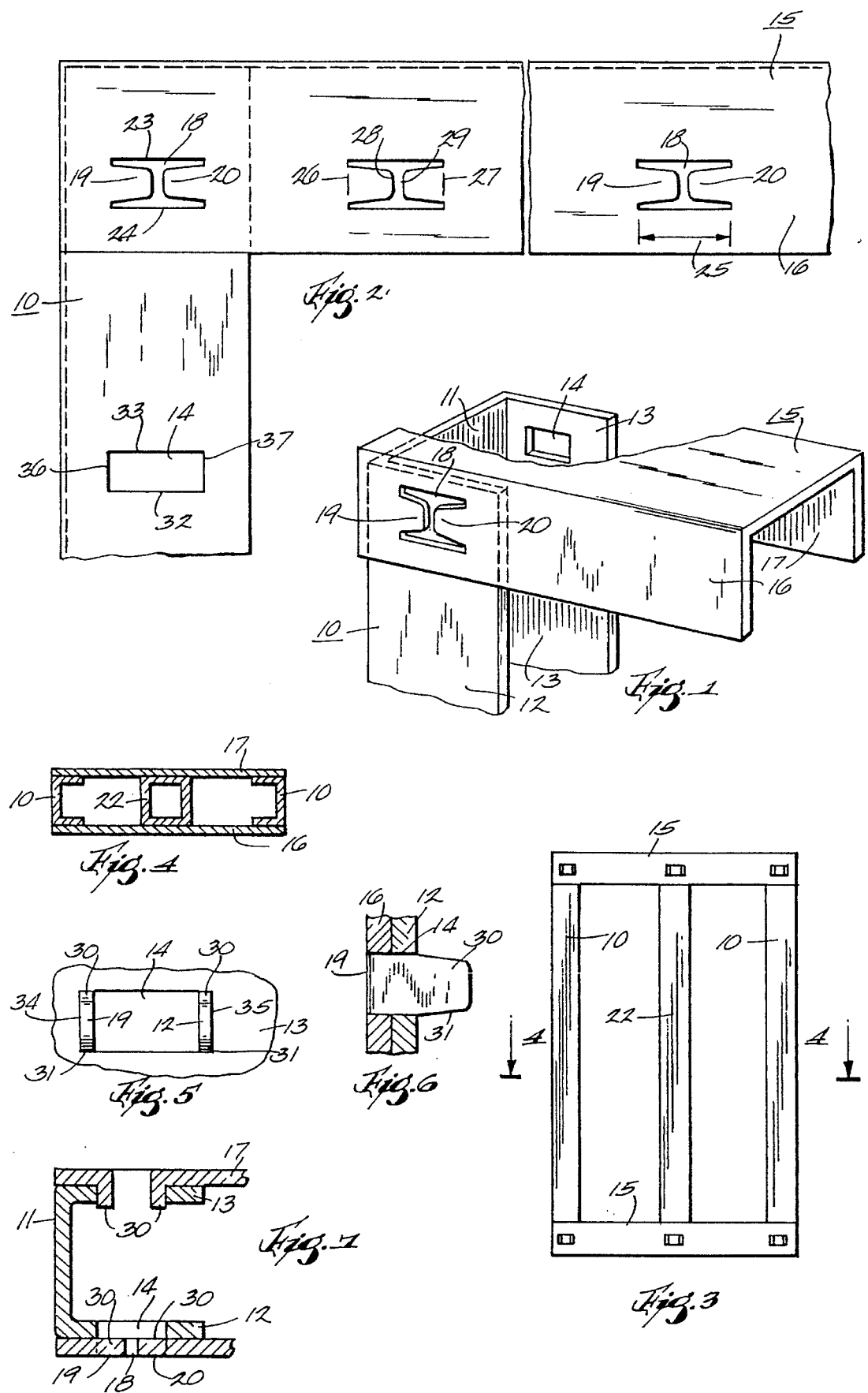

FASTENING TAB

BACKGROUND OF THE INVENTION

There are many ways to fasten metal beams and brackets together and, of course, the most well-known are screws, bolts, rivets the like.

In many instances, however, it is not easy or effective to use such fasteners, and it is more economical to be able to form the fastening device out of the same material as the elements which are being fastened together.

In the manufacture and production of metal frames for buildings and particularly for doors or windows and the like, and in particular in heavy-duty installations, such as factories, farm buildings, etc., fairly heavy and large and thick channel beams are used, and many have a U-shaped cross-section.

In the production of large doors for aircraft hangers, farm barns, truck garages and the like, these channel members are often made of 14 gauge steel, which is 0.074" thick. A typical beam is 4" wide with legs 2" long and provides a heavy, rigid form-retaining member.

In the assembly of such doors, it is found to be particularly effective to fasten the members together using a tab which is formed in the leg or legs of one of the members, and which can be bent or inserted into an abutting or mating hole in another of the metal members.

A form of such a fastener is shown in U.S. Pat. Nos. 4,021,988 and 4,494,354. As practical as such devices have been in the past, they are ineffective because the slots are bigger than the tabs whereby the tabs and the slots do not fit closely together. In the manufacture thereof, the tolerances provide further discrepancies which, when the beams are assembled, do not pull them tightly, one to the other.

To overcome such problem, the tabs of prior devices had to be curled around the edge of the openings and crimped against the inner surface of the channel members. This was often difficult, if not impossible, and the result was that the members were not tightly connected.

It is an object of the present invention to provide a tab and slot arrangement for holding metal channel members together in such a way that the elements are held together rigidly and immovably in the longitudinal as well as the transverse direction.

Another object of the present invention is to provide an inexpensive means for securely inter-connecting U-shaped channel members.

Another object of the present invention is to provide a rigid fastening member for U-shaped channels which does not require the use of third elements such as screws, rivets, bolts and the like.

With the above and other objects in view, further information and a better understanding of the present invention may be achieved by referring to the following detailed description.

DESCRIPTION OF THE PREFERRED EMBODIMENT

For the purpose of illustrating the invention, there is shown in the accompanying drawings a form thereof which is at present preferred, although it is to be understood that the various instrumentalities of which the invention consists can be variously arranged and organized, and that the invention is not limited to the precise arrangement and organizations of the instrumentalities as herein shown and described.

In the drawings, wherein like reference characters indicate like parts:

FIG. 1 is a fragmentary perspective view of two U-shaped channel members with the fastening tabs of the present invention.

FIG. 2 is a front vertical view of the assembly shown in FIG. 1.

FIG. 3 is a front vertical view of a door frame having the three vertical channel members and a top and a bottom channel member.

FIG. 4 is a horizontal or cross-section taken along line 4—4 of FIG. 3.

FIG. 5 is a fragmentary view of an assembly arrangement with the tabs of one channel member extending into a slot in the other channel member.

FIG. 6 is a fragmentary cross-sectional view of two channel member legs showing a tab on one member bent into a slot of another member.

FIG. 7 is a horizontal cross-sectional view of the interaction of one channel member with another, showing the tabs in one leg bent into the slots of a leg of another channel, and also showing the tabs on the other leg of the first member in alignment with but not bent into the corresponding slot in the other member's leg.

The channel member 10 best seen in FIGS. 1 and 2 is generally vertical and has a base 11 and side legs 12 and 13.

In each of the legs 12 and 13, there is a slot 14, being shown clearly in FIGS. 1 and 2 and being obscured in the leg 12 in FIG. 1.

Also in FIGS. 1 and 2, a second channel member 15 is shown, having legs 16 and 17. It is placed at the top end of channel member 10. In each of the legs 16 and 17 an irregularly-shaped hole 18 is created, having tabs 19 and 20 formed therein.

In FIG. 2, it is clearly shown how the channel member 10 has a slot 14 formed in leg 12. Another such slot 14 is formed in the leg 13 of the channel member 10. Both of the slots 14 are in alignment with tab holes 18 formed in legs 16 and 17.

A plurality of tab holes 18 are shown along the channel member 15 and plurality of slots 14 in channel member 10.

The channel members can be arranged to form a frame 21 as shown in FIG. 3, and such a frame can include not only the horizontal channel members 15 and the vertical channel members 10, but also a central channel member 22 which has a square or box-shaped cross-section as shown particularly in FIG. 4.

The shape of the tabs 19 and 20 and the slot 14 are designed to be able to create a tight connection between adjoining channel members. In a preferred embodiment, the distance between the upper edge 23 and the lower edge 24 of the tab hole 18 is ½, and the length 25 of the tab hole is 1".

The slots 14 are also 1" long, but the width is only 0.375".

The width of the base of the tabs 19 and 20, as shown at 26 and 27, is 0.435" and the width of tips 28 and 29, (which are separated by 0.080") is 0.281".

Thus when the channel member 10, with the slots 14, is placed properly within the legs 16 and 17 of the channel member 15, a slot 14 will be in alignment with an adjacent tab hole 18.

By forcing tabs 19 and 20 into a slot 14, as shown in FIG. 5, 6, and 7, the angular edges 30 and 31 are wedged against the top and bottom edges 32 and 33 of a slot 14, and the inner walls 34 and 35 of the tabs 19 and 20 are forced against the side edges 36 and 37 of the slot 14.

By this construction a fastening device is provided which does not require any expensive third fastening members, which can be formed as an integral part of the channel members themselves, and which rigidly retain the two channel members together because the tapered edges of the tabs create a wedging action which provides a rigidity in the cross-direction, just as the sidewalls of the tabs when forced against the side of the holes form a rigidifying member in the longitudinal direction.

Thus a firm and sturdy connection between channel members can be created without the necessity of curling the tabs within the channel members. Such curling, in prior practices, has been imprecise and very difficult and can be eliminated with the present invention, with a saving in time and with a creation of a more secure attachment.

It is furthermore to be understood that the present invention may be embodied in other specific forms without departing from the spirit or special attributes; and it is, therefore, desired that the present embodiments be considered in all respects as illustrative and, therefore, not restrictive, reference being made to the appended claims rather than to the foregoing description to indicate the scope of the invention.

Having thus described the invention, what is claimed as new and desired to protect by Letters Patent are the following:

1. A device for rigidly interconnecting a first and a second member, said first member having a rectangular hole with side edges and end edges formed therein, said second member having a generally H-shaped hole with a pair of tabs defining a part of said hole, said tabs being tapered with a base and a tip and having edges defining said taper, the tips of said tabs on said second member being movable into the rectangular holes of said first member, the edges of said tabs being farther apart at their base than the width of the end edges of the rectangular hole.

2. The device of claim 1 wherein the members are made of sheet metal.

3. The device of claim 2 wherein the sheet metal members are made of 14 gauge sheet steel.

4. The device of claim 1 wherein the members are interconnected when the tabs of the second member are bent at a right angle thereto into the holes in the first member and the tabs are in contact with the end edges of the hole.

5. The device of claim 1 wherein the tabs have a width of 0.281 inches and a base width of 0.435 inches and the hole has a length of 1 inch and a width of 0.375 inches and the tab tips are separated by 0.80 inches.

* * * * *